(12) United States Patent
Cayla et al.

(10) Patent No.: US 7,693,126 B2
(45) Date of Patent: Apr. 6, 2010

(54) RADIO TELECOMMUNICATIONS SYSTEM AND METHOD OF OPERATING THE SAME WITH POLLING

(75) Inventors: Stéphane Cayla, Viroflay (FR); Arnaud Le Clercq De Lannoy, Versailles (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 1196 days.

(21) Appl. No.: 10/810,507

(22) Filed: Mar. 26, 2004

(65) Prior Publication Data

US 2005/0105503 A1 May 19, 2005

(30) Foreign Application Priority Data

Mar. 31, 2003 (EP) .................................. 03290811

(51) Int. Cl.
*H04W 72/00* (2009.01)

(52) U.S. Cl. .................... 370/346; 370/329; 370/235

(58) Field of Classification Search ................. 370/229, 370/230.1, 231, 235, 238, 245, 252, 253, 370/299, 310.2, 328, 329, 346, 352–356, 370/345, 349; 340/3.5, 3.51, 825; 455/517, 455/39, 500, 507, 509
See application file for complete search history.

(56) References Cited

U.S. PATENT DOCUMENTS

| | | | |
|---|---|---|---|
| 4,763,323 A | | 8/1988 | Nelson et al. |
| 5,577,046 A | | 11/1996 | Diachina et al. |
| 5,896,561 A | | 4/1999 | Schrader et al. |
| 5,973,609 A | * | 10/1999 | Schoch .................... 370/449 |
| 6,072,468 A | * | 6/2000 | Hocker et al. ............. 345/157 |
| 6,892,131 B2 | * | 5/2005 | Coffee et al. ............. 701/200 |
| 6,996,119 B2 | * | 2/2006 | Koo ........................ 370/449 |
| 7,016,372 B2 | * | 3/2006 | Haartsen .................. 370/461 |
| 7,039,428 B1 | * | 5/2006 | Helferich .................. 455/458 |

(Continued)

FOREIGN PATENT DOCUMENTS

EP 0 483 546 A1 5/1992

OTHER PUBLICATIONS

ETSI EN 300 909 V8.5.1 (Nov. 2000), "Digital cellular telecommunications system (Phase 2+); Channel coding (GSM 05.03 version 8.5.1. Release 1999)," pp. 1-117 (2000).

(Continued)

*Primary Examiner*—Jean A Gelin
(74) *Attorney, Agent, or Firm*—Trop Pruner & Hu, P.C.

(57) ABSTRACT

An apparatus or method for transmitting data blocks on a communications channel having a radio link between two stations including a user equipment comprises receiving first data blocks from the user equipment, and transmitting second data blocks to the user equipment. A polling interval is dynamically set for the transmission of polling messages to the user equipment after transmission of the second data blocks, the polling interval being set in accordance with at least one of: a size of one or more data blocks received by the apparatus from the user equipment, a size of one or more blocks transmitted from the apparatus to the user equipment, and a service to which the user equipment is subscribed. The apparatus may be used as a PCU in a cellular mobile telephone system.

18 Claims, 8 Drawing Sheets

U.S. PATENT DOCUMENTS

| | | | |
|---|---|---|---|
| 7,089,476 B2* | 8/2006 | Cayla | 714/748 |
| 2002/0112040 A1* | 8/2002 | Chang et al. | 709/223 |
| 2003/0174070 A1* | 9/2003 | Garrod et al. | 340/870.07 |
| 2004/0081133 A1* | 4/2004 | Smavatkul et al. | 370/346 |

OTHER PUBLICATIONS

Draft ETSI EN 301 349 V8.4.0 (May 2000), "Digital cellular telecommunications system (Phase2+); General Packet Radio Service (GPRS); Mobile Station 9MS)—Base Station System (BSS) interface; Radio Link Control/Medium Access Control (RLC/MAC) protocol (GSM 04.60 version 8.4.0 Release 1999)," pp. 1-244 (2000).

T. Ojanperä, "Wideband CDMA for Third Generation Mobile Communications," pp. 1-6, (1998).

J. Geier, "Wireless Lans, Implementing Interoperable Networks," pp. 1-3, (1999).

3GPP TS 08.18 V8.10.0 (May 2002), Third Generation Partnership Project; Technical Specification Group GSM EDGE Radio Access Network; General Packet Radio Service (GPRS); Base Station System (BSS)—Serving GPRS Support Node (SGSN); BSS GPRS Protocol (BSSGP) (Release 1999), pp. 1-72 (2002).

* cited by examiner

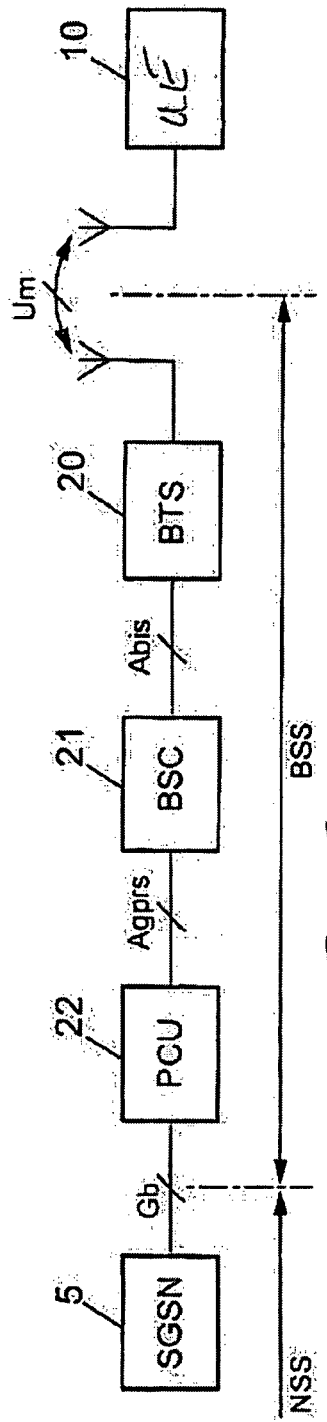
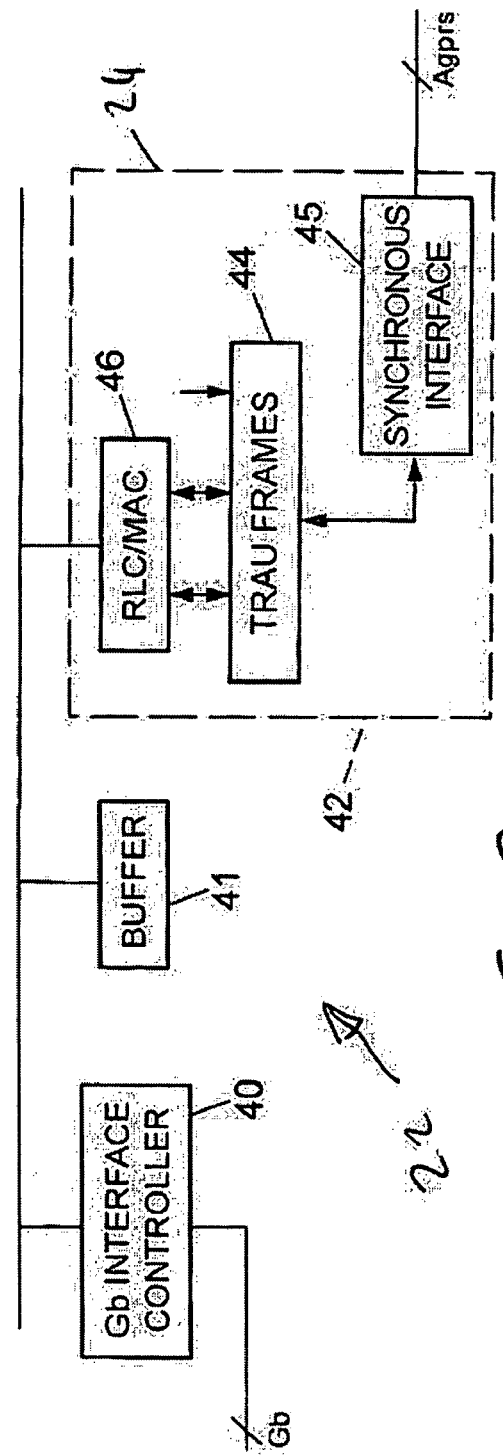
Fig. 5
Fig. 7

RADIO TELECOMMUNICATIONS SYSTEM AND METHOD OF OPERATING THE SAME WITH POLLING

The present invention relates to wireless telecommunication networks, especially cellular wireless telecommunications networks as well as satellite systems, wireless Local Area Networks (LAN) and Metropolitan Area Networks (MAN) and network elements for use therewith. It is particularly relevant to such telecommunication systems which have been optimized for packet data transmission.

TECHNICAL BACKGROUND

Traditionally, radio telecommunication systems have been designed almost exclusively for voice or for packet data. There have been several attempts to design systems to provide both data and voice in the same system. One such proposal is the ETSI General Packet Radio Service (GPRS) which is designed for packet data transfer and is an overlay network on the circuit switched GSM system which is designed for speech communication. A GPRS architecture proposed by ETSI in Technical Specification 3.6 is shown in FIG. 1. Shown mainly on the left of the diagram is a conventional GSM mobile telephone system for full duplex voice communications comprising a Mobile Switching Centre (MSC) a Base Station System (BSS) usually including a Base Station Controller (BSC) and a Base Transceiver Station (BTS), and a mobile terminal (MT) and a Home Location Register (HLR). Packet data services are limited to the Short Message Service (SMS) which is dealt with by an SMS Gateway Mobile Switching Centre (SMS-GMSC) and a Short Message Service Centre (SM-SC). Fax is dealt with as in an ordinary telephone system, e.g. via suitable modems and an Interworking Function (IWF) fax data is transmitted via circuit switching. Hence, conventional mobile telecommunications systems generally use what may be described as circuit switched data transmissions. GPRS adds two new nodes to such a system, namely the Serving GPRS Support Node (SGSN) and the Gateway GPRS Support node (GGSN), both of which may be seen as routers. The SGSN contains the identity of MT in its routing tables which are inserted when the MT registers with the network. The GGSN is connected to other data carrying networks, for example a Packet Data network (PDN), for the receipt and transmission of packets of data. As the GPRS system is in parallel to the GSM system information about change of location of the MT is also sent to the SGSN/GGSN.

The above hybrid system may be adapted to a Third Generation Mobile Telephone system such as the UMTS system as shown schematically in FIG. 2. Further details of such an implementation may be found in the book by Ojanperä and Prasad, "Wideband CDMA for Third Generation Mobile Communications", Artech House Publishers, 1998. Basically, the Radio Access Network (RAN) provides the network-side equipment for communicating with the MT. A GPRS SGSN and a UMTS MSC are provided in parallel between the RAN and the relevant network, i.e. or a PDN or a Public Service Telephone Network (PSTN), respectively.

For multimedia and especially highly interactive wireless applications there can be a wide variation in the amount of data to be sent in one direction as well as in the rate at which replies to the data are expected. Further, there is a general interest in providing services at difference priorities and at different prices. Thus, the GPRS standards provide, especially in ETSI standard 3GPP TS 08.18 (e.g. V8.10.0 (2002-05)), possibilities to dynamically adjust the Quality of Service (QoS) for data transmitted over the air interface.

GPRS provides a connectionless support for data transmission. However, in order to use the scarce resources on the radio air interface between the BTS and the MT, a circuit switched radio resource allocation is used. Thus, although the networks attached to the GGSN may operate in a completely connectionless way, the transmission of the data packets across the air interface makes use of conventional timeslot and frame management. Accordingly, at some position in the GPRS network a packet handler is required which prepares the packets for transmission in frames across the air interface and receives the frames from the air interface and prepares them for transmission to the data network. This unit may be called a Packet Control Unit (PCU) and may be placed at several alternative positions, e.g. in the Base Transceiver Station (BTS), in the Base Station Controller (BSC) or between the BSC and the SGSN. Generally, the PCU may be assigned to some part of the BSS—the base station system. Typically frame relay will be used between the PCU and the SGSN.

Referring to FIGS. 1 and 2, in order to access GPRS services, a user equipment (UE) such as a mobile terminal (MT) or mobile phone first performs a GPRS attachment. This operation establishes a logical link between the UE and the SGSN, and makes the UE available for SMS (Short Message Services) over GPRS, paging via SGSN, and notification of incoming GPRS data. Also the authentication of the user is carried out by the SGSN in the GPRS attachment procedure. In order to send and receive GPRS data, the UE activates the packet data address wanted to be used, by requesting a PDP activation procedure (Packet Data Protocol). This operation makes the UE known in the corresponding GGSN, and interworking with external data networks can commence. More particularly, a PDP context is created in the UE, the GGSN and the SGSN. The packet data protocol context defines different data transmission parameters, such as the PDP type (e.g. X.25 or IP), the PDP address (e.g. X.121 address), the quality of service (QoS) and the NSAPI (Network Service Access Point Identifier). The UE activates the PDP context with a specific message comprising the TLLI (Temporary logic link Identity), an Activate PDP Context Request, in which it gives information on the PDP type, the PDP address, the required QoS and the NSAPI, and optionally the access point name (APN). The SGSN provides the TLLI which identifies the UE.

The setting up of circuit switched calls across the air interface in a GPRS network is shown in message flows in FIGS. 3 and 4. In FIG. 3 a data request is initiated by a mobile terminal (MT) using an access control channel, e.g. a Random Access Channel RACH. When a MT has some data to send it makes an Uplink Radio Connection Establishment Request specifying how much data is to be sent. The RAN replies with a confirmation message that the uplink radio link is provided and gives details of when and how the MT is to transmit, e.g. which timeslot and how much of the timeslot can be used. Then the data is transmitted by the MT on a traffic channel and the RAN disconnects the radio link after all data has been transmitted successfully. The data received by the RAN is forwarded to the SGSN and from there to the GGSN which removes any headers used for transporting the data up to this point and transfers the data to the relevant PDN, e.g. via the Internet to a remote server. As some time later the answer to the data arrives from the remote site, e.g. a service provider's server on the Internet. On receipt of this answer a downlink radio connection is set up by the RAN via a control channel and the answer data transferred via a traffic channel. After transfer the radio connection is released once again.

FIG. 4 shows a similar message scheme when the initiating message is downlink. Again, the downlink and uplink transfers are not coupled so that the downlink radio connection is released at the end of the downlink transmission and before the answering uplink transmission.

Data transmission over an air interface is subject to errors. For some packet data transmissions some guarantee of the received data is required. Traditionally this has been achieved by an automatic repeat request (ARQ) protocol in which ACK (accepted) and NACK (not accepted) messages returned depending on whether a received block of data was correctly received or not. Either the failure to receive an ACK message within a predetermined time or the receipt of a NACK message triggers resending of the data. A known problem with such as scheme is setting an optimum time interval for receipt of an ACK message before the data is resent. Too short a time can result in data being resent frequently when an ACK message is still going to be received and would have stopped the resend. Too long a time can result in use of large buffers to accommodate data until the status of this data is clarified. U.S. Pat. No. 6,289,224 proposes a scheme in which the length of time for an outbound communication is determined and this is transmitted to the transmitting device so that the timer can be started. This known technique relies on the fact that the type of data to be sent is sensibly constant. However, in the type of applications mentioned above the data rates and answer frequencies can be very varied and the known scheme is not optimal in all circumstances.

It is an object of the present invention to provide a data carrying cellular mobile radio telecommunications system and a method of operating the same which provides an improved QoS.

SUMMARY OF THE INVENTION

It is an object of the present invention to provide apparatus for a data carrying cellular mobile radio telecommunications system and a method of operating the same which provides an improved QoS.

The present invention provides an apparatus for transmitting data blocks on a communications channel having a radio link between two stations including a user equipment, comprising:

means for receiving first data blocks from the user equipment;

means for transmitting second data blocks to the user equipment; and means for dynamically setting a polling interval for the transmission of polling messages to the user equipment after transmission of the second data blocks, the polling interval being set in accordance with at least one of: a size of one or more data blocks received by the apparatus from the user equipment, a size of one or more blocks transmitted from the apparatus to the user equipment, and a service to which the user equipment is subscribed.

The means for dynamically setting a polling interval may be adapted to set the polling interval for each user equipment independently or for a group of user equipments. The group of user equipments may be defined by a subscription to a service. The user equipment may comprise one or more user equipments having a first priority and one or more user equipments having a second priority lower than the first priority, and the means for dynamically setting a polling interval may be adapted to reduce the polling interval when the user equipments having a first priority are not transmitting.

The apparatus may comprise a buffer means for buffering data blocks to be transmitted to the UE by the apparatus. The means for dynamically setting a polling interval may be adapted to set the polling interval in accordance with an occupancy state of the buffer means.

The user equipment may be located in a radio coverage area of a cellular mobile radio network and the means for dynamically setting a polling interval may be adapted to set the polling interval in accordance with at least an estimated used transmission capacity value for the radio coverage area.

The means for dynamically setting a polling interval may include a storage unit for storing information relating to user equipments. The storage unit may include data relating to any of: a user equipment identifier, a quality of service profile associated with a user equipment, a number of user equipments located within a geographical area. The means for dynamically setting a polling interval may be adapted to set the polling interval in accordance with a quality parameter of signals received over the radio link.

The above apparatus may be part of a cellular radio telecommunication network comprising one or more base stations in communication with one or more user equipments. The apparatus may be a packet control unit which has a first input for data from an asynchronous interface and a second input for data from a synchronous interface.

The present invention provides a method for transmitting data blocks over a communications channel including a radio link between two stations to and from a user equipment, comprising:

receiving first data blocks from the user equipment;

transmitting second data blocks to the user equipment; and dynamically setting a polling interval for the transmission of polling messages to the user equipment after transmission of the second data blocks, the polling interval being set in accordance with at least one of: a size of one or more data blocks received by the apparatus from the user equipment, a size of one or more blocks transmitted from the apparatus to the user equipment, and a service to which the user equipment is subscribed.

The method may include setting the polling interval for each user equipment independently or for a group of user equipments. One or more user equipments may have a first priority and one or more user equipments may have a second priority lower than the first priority, and dynamically setting a polling interval may comprise reducing the polling interval when the user equipments having a first priority are not transmitting. The user equipment may be located in a radio coverage area of a cellular mobile radio network and dynamically setting a polling interval may comprise setting the polling interval in accordance with at least an estimated used transmission capacity value for the radio coverage area.

The present invention will now be described with reference to the following drawings.

BRIEF DESCRIPTION OF THE DRAWINGS

FIG. 5 is a detail of a mobile telephone network with packet data transmission capacity with which the present invention can be used.

FIG. 7 is a schematic representation of a PCU with which the present invention can be used.

DESCRIPTION OF THE ILLUSTRATIVE EMBODIMENTS

The present invention will be described with respect to particular embodiments and with reference to certain drawings but the invention is not limited thereto but only by the claims. The drawings described are only schematic and are non-limiting. The drawings are not drawn to scale.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

In particular the present invention will mainly be described with reference to cellular mobile telephone systems but the present invention is not limited thereto. For instance, the present invention may be advantageously used in wireless local area networks (LAN) or Metropolitan Access Networks particularly when there is an asymmetrical flow of data. Various types of wireless LAN have been standardized or are in general use, e.g. the standards IEEE 802.11, IEEE 802.11HR (Spread Spectrum) and systems based on DECT, BlueTooth, HIPERLAN, Diffuse or point-to-point infra-red. Wireless LAN's are discussed in detail in "Wireless LAN's" by Jim Geier, Macmillan Technical Publishing, 1999. Further, the present invention will mainly be described with reference to a TDMA system such as GSM or GPRS but the present invention is not limited thereto. The sharing of a data channel by multiple user terminals may include for instance sharing a code in a CDMA system or sharing a frequency in a Frequency Division Multiple Access system. Examples of wireless communication networks with support for packet data transfer to the wireless terminal of a mobile user are PDC-P networks (Pacific Digital Cellular), which in Japan provides the existing I-mode service, GSM networks (Global System for Mobile Communications) providing GPRS services (General Packet Radio Service), particularly in Europe and systems using radio networks based on EDGE technology (Enhanced Data Rates for GSM and TDMA/136 Evolution). Further, the present invention will mainly be described with respect to a cellular mobile telephone system but the present invention may find advantageous use in a Public Mobile Radio (PMR) system.

Figure 1:
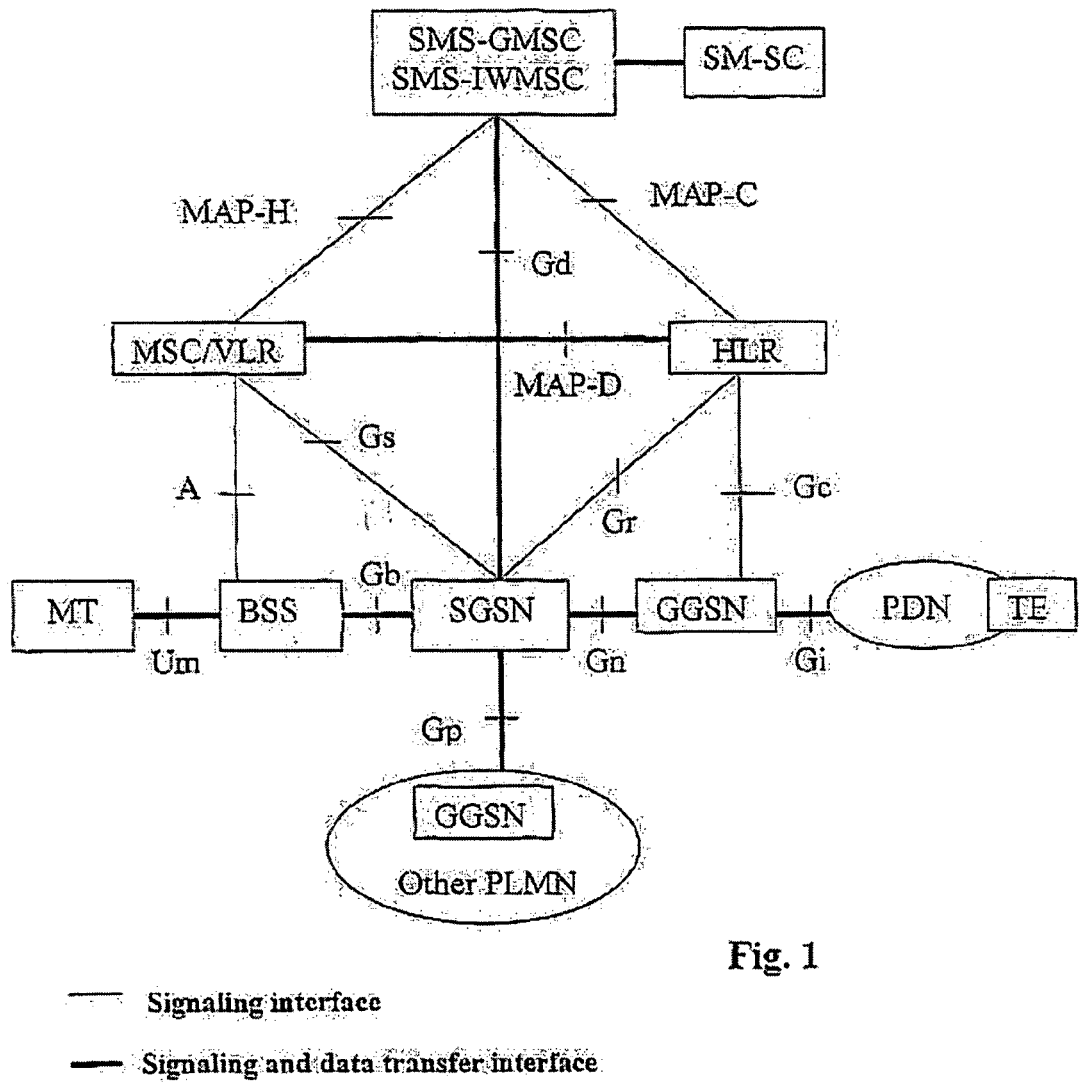
FIGS. 1 and 2 are schematic diagrams of a mobile telephone network to which the present invention may be applied.
Figure 2:
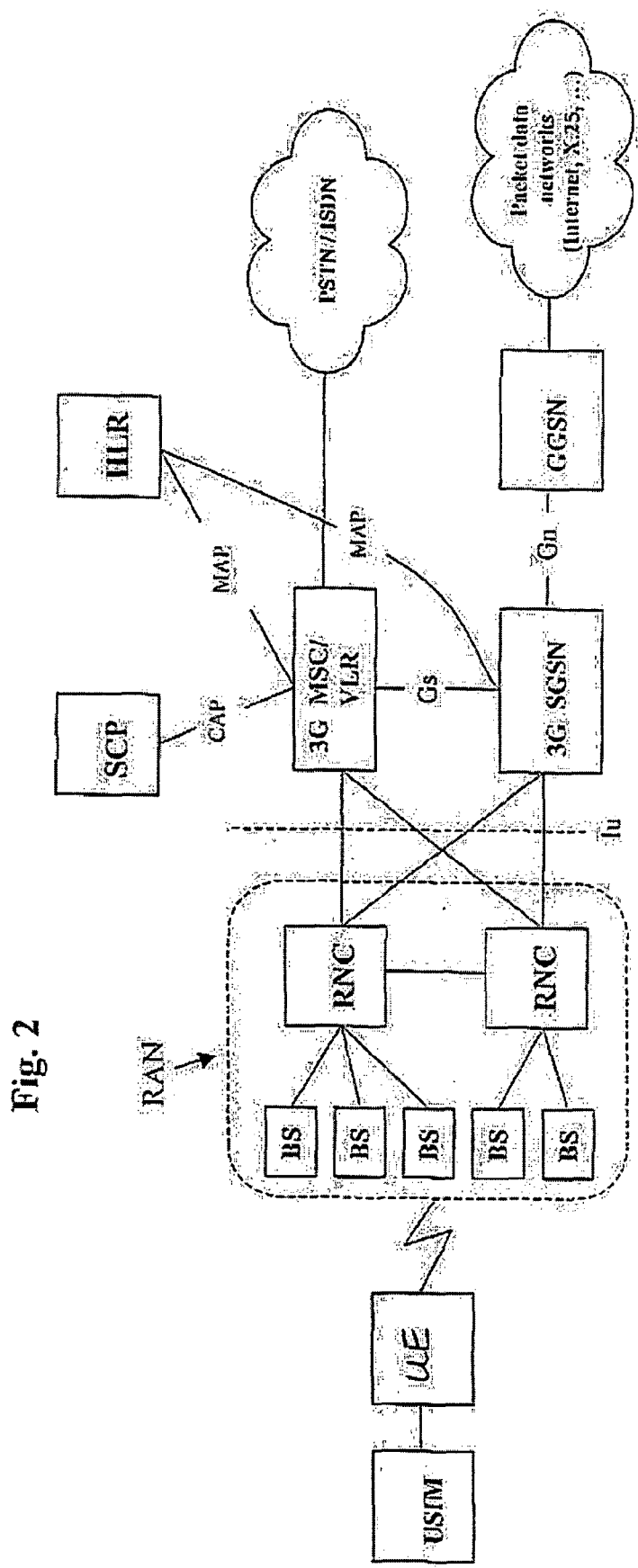
Figure 3:
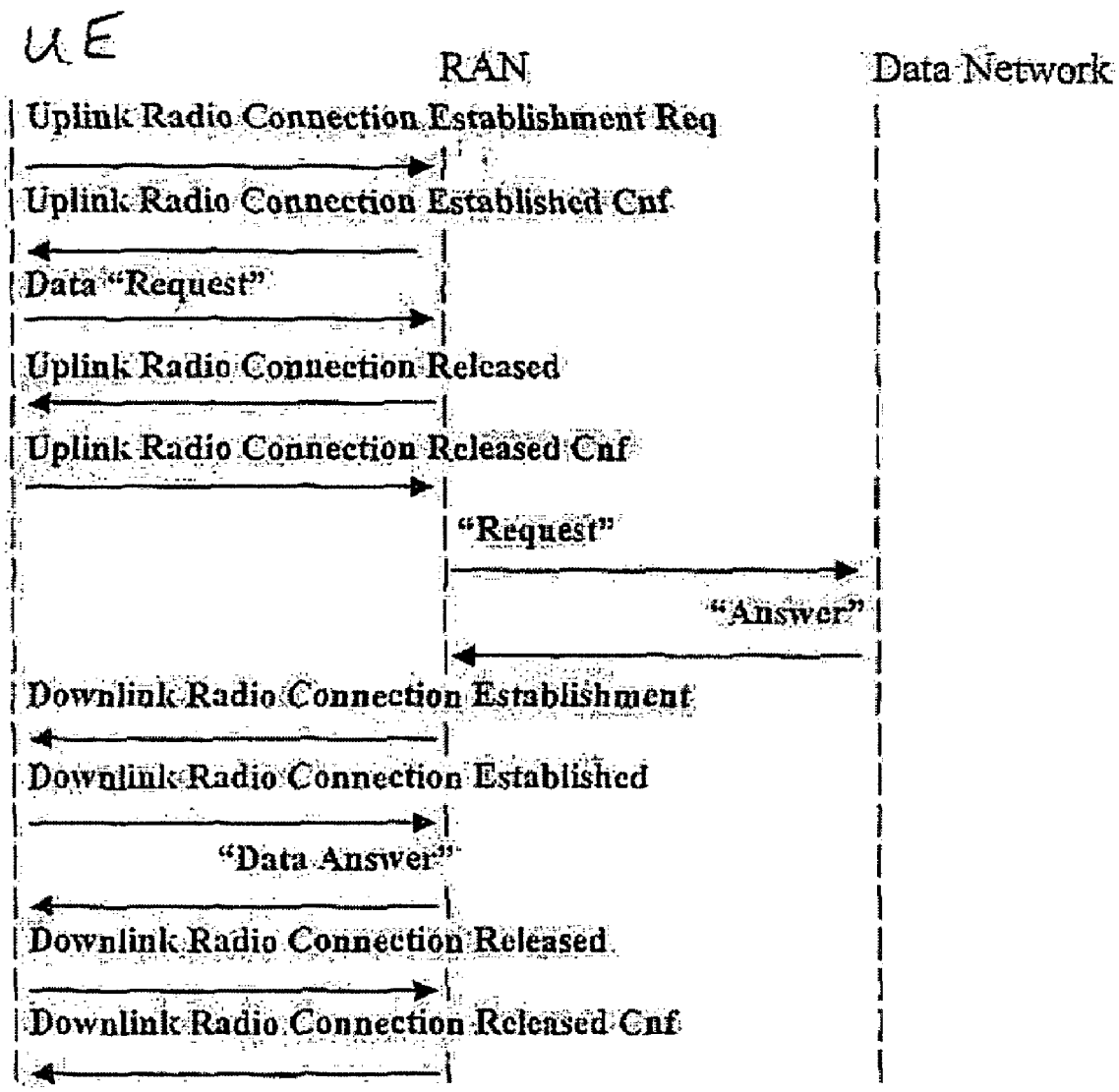
FIGS. 3 and 4 are conventional message flows for transmitting data blocks across an air interface between a user equipment a RAN and a data network.
Figure 4:
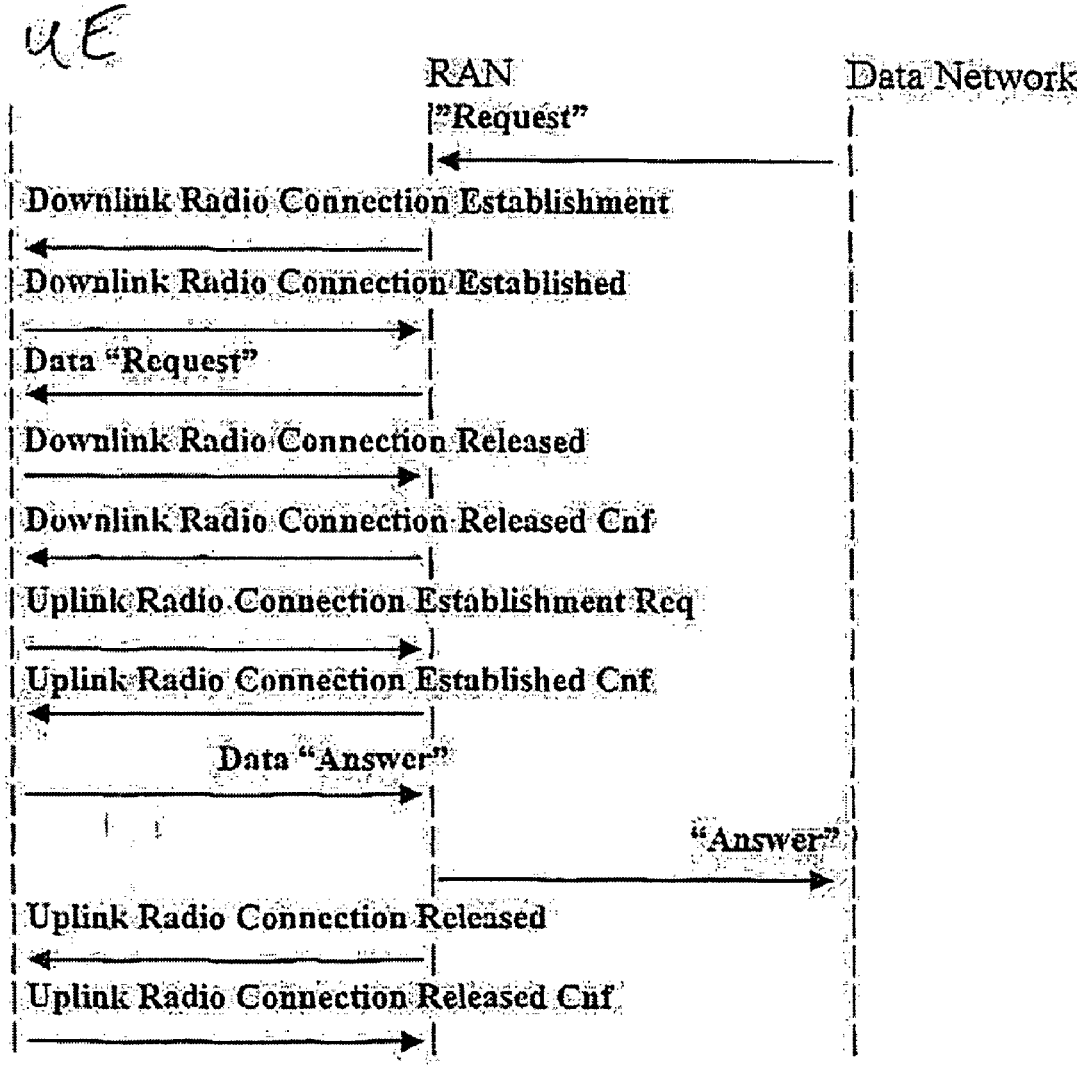

Referring to FIGS. 1, 2 and 5 each base station 20 is supervised by a base station controller 21 or BSC by way of an interface called Abis. In order to manage the transmission of GPRS packets, the BSS further comprises a packet control unit or PCU 22. The present invention does not require the location of the PCU 22 to be within the BSS. The present invention is generally applicable whether the data source consisting of the PCU 22 is remote from the sending stations consisting of the BTS's 20 or not. The BTU 20 can communicate with one or more user equipments UE 10. The UE 10 may be any suitable communicating device whether mobile or stationary, e.g. a mobile phone, a laptop, a Personal Data Assistant (PDA), a pocket PC, a palmtop, a desktop computer, etc. In the example represented in FIG. 5, the PCU 22 is situated between the BSC 21, with which it communicates via an interface called AGPRS, and the SGSN 5, with which it communicates via the interface Gb. The SGSN 5 is linked to the BSS by way of an interface called Gb, and the GGSN serves as a gateway with external packet transmission networks (PDN), such as the Internet, for example.

Figure 6:
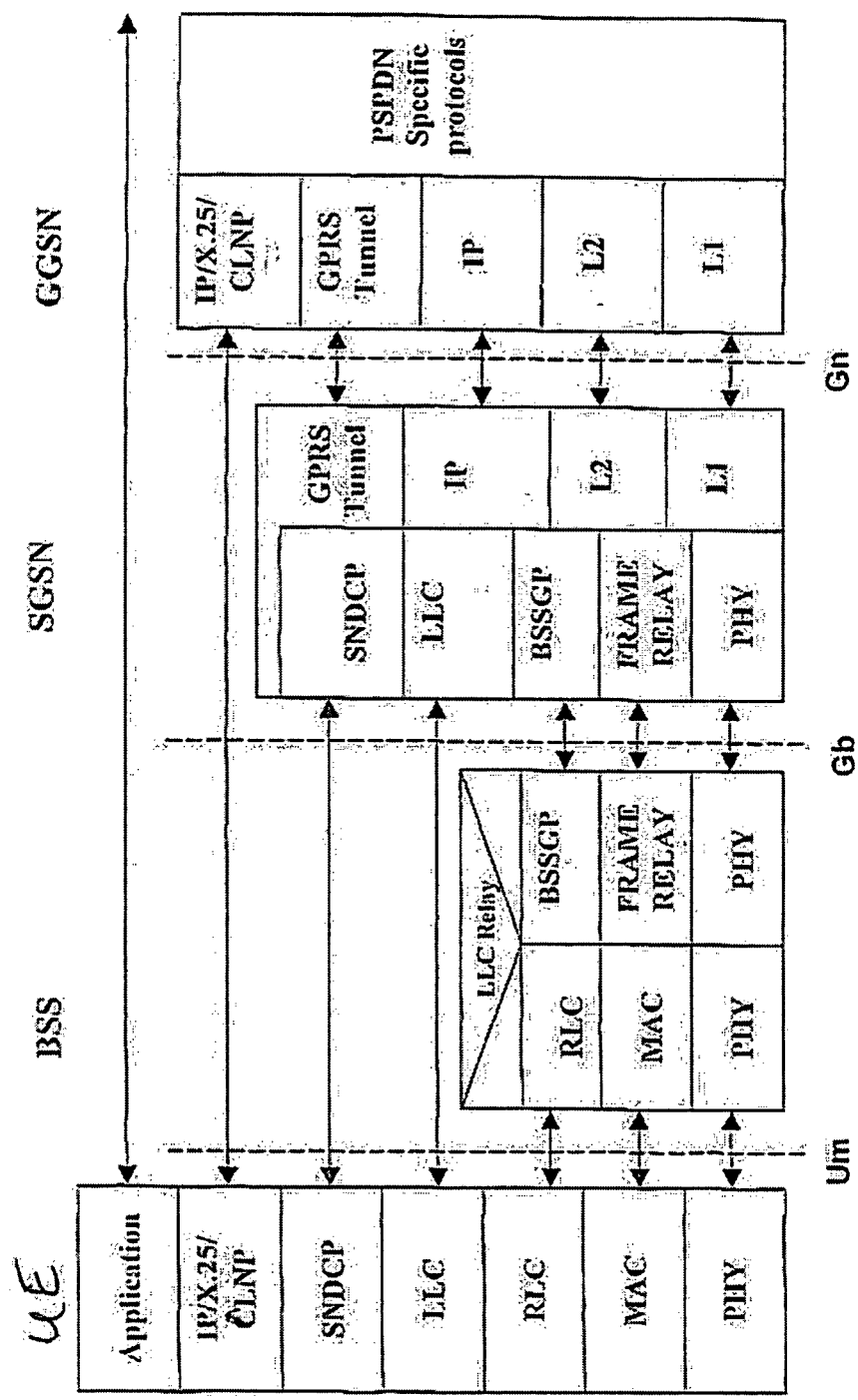
FIG. 6 is a conventional protocol stack which can be used with the present invention.

The Gb interface is of asynchronous type. A protocol stack is shown in FIG. 6. It is typically based on the frame relay (FR) protocol, as well as on a protocol called BSSGP (BSS GPRS Protocol) which transports routing and quality-of-service information between the BSS and the SGSN. A Gb interface controller provides the physical link with the SGSN, as well as carrying out the procedures specific to the FR and BSSGP protocols.

A schematic PCU 22 is shown in FIG. 7. The links between the PCU 22 and the BTSs 20 via the AGPRS interface are of synchronous type and hence packets arriving from the asynchronous Gb interface need to be queued. Consequently, a buffer 41 is provided to manage packet queues and AGPRS and Gb interface controllers 24, 40, respectively to control packet flow. A module 46 of the AGPRS interface controller 24 implements the radio protocols of layer 2 of the OSI model, that is to say the RLC/MAC (Radio Link Control/Medium Access Control—see FIG. 6) protocols described in the European Standard ETSI EN 301 349, "Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60, version 8.3.1, Release 1999)", published by ETSI in October 2000.

The RLC sublayer forms the interface with the upper-layer protocol, called LLC (Logical Link Control). It carries out the segmentation and the reassembling of LLC protocol data units (LLC-PDUs), which are exchanged asynchronously on the Gb interface. It produces RLC data blocks to which the MAC sublayer adds a one-byte MAC header.

In the downlink direction, from the PCU 22 to the UE's 10, the MAC header of each RLC/MAC block includes:

a) a three-bit USF (Uplink State Flag) field, serving to indicate which UE 10 is authorized to use an uplink resource corresponding to the downlink resource on which the RLC/MAC block is transmitted;

b) a three-bit acknowledgement control field, including a one-bit S/P (Supplementary/Polling) subfield indicating whether the acknowledgement-control field is active (S/P=1) or inactive (S/P=0) and a two-bit RRBP (Relative Reserved Block Period) subfield uniquely specifying an uplink block in which the UE 10 which is addressed should transmit an acknowledgement message;

c) a two-bit Payload Type field, specifying the type of RLC block following (data, control, etc).

Each RLC block includes an RLC header following the MAC header byte. This RLC header especially includes the following information:

a) a Temporary flow identity (TFI), consisting of five bits identifying the temporary block flow (TBF), from which the RLC data of the block originate. A TBF is a connection supporting the unidirectional LLC-PDU transfer on physical data channels. A TBF is temporary, that is to say that it is maintained only during a time of data transfer;

b) a block sequence number BSN which relates to a sequence number of the RLC/MAC block in the TBF.

The MAC sublayer manages the multiplexing of the blocks arising from the various TBFs which are active on the available physical channels, arbitrating among the various UE's 10 via a planning mechanism.

A corresponding RLC/MAC entity of a UE 10, which is the addressee of the downlink data blocks of a TBF, keeps a reception-state variable V(R) up-to-date for this flow, which indicates the BSN following the highest BSN received on this TBF. The number V(R) thus points to the end of a reception window, the length of which is WS RLC/MAC blocks. Upon receipt of a polling command from the transmission controller 53, i.e. a block whose MAC header has the S/P bit equal to 1, the UE 10 returns, in the uplink blocks specified by the RRBP subfield, a PDAN (Packet Downlink Ack/Nack) acknowledgement message which in particular includes:

a) an SSN (Starting Sequence Number) field of SNS bits containing the current variable V(R) for the TBF; and b) an RBB (Receive Block Bitmap) field representing a bitmap of WS bits indicating those blocks of the reception window which have been correctly received.

A positive acknowledgement of a block is indicated by the value 1 of the relevant part of the bitmap represented by RRB, and a negative acknowledgement by the value 0.

Upon receipt of the PDAN message, a module 55 of the PCU 22 updates (see FIG. 8), for the TBF, an acknowledgement-state variable V(A) which contains the BSN of the oldest block which has not been positively acknowledged, as well as a table V(B) with WS entries indicating the acknowledgement states of WS consecutive blocks respectively from that designated by V(A), these WS consecutive blocks forming a transmission window. The possible acknowledgement states are: positive acknowledgement (ACK); negative acknowledgement (NACK), and acknowledgement not yet received (ACK_PENDING). The state variables V(A) and V(B) are deduced directly from the SSN and RBB fields received in the last PDAN message. The RLC/MAC protocol allows blocks to be transmitted only within the transmission window thus managed by the PCU 22. Outside this window, transmission of the blocks is inhibited.

In the case of GPRS, the standard specifies the values SNS=7, WS=64. A variable level of protection can be selected block by block within a TBF, by the choice of a coding scheme (CS) from among four schemes CS-1 to CS-4 specified in the European Standard ETSI EN 300 909, Digital cellular telecommunications system (Phase 2+); Channel coding (GSM 05.03, version 8.5.1, Release 1999), published by ETSI in November 2000.

Scheme CS-4 does not use any error-correction coding, i.e. the coding rate is equal to 1: only a block check sequence BCS is appended to the data blocks. Schemes CS-1 to CS-3 use a convolutional code of rate ½ after the addition of the BCS sequence. No puncturing is carried out in the CS-1 scheme (which offers the highest level of protection), while puncturing is applied in the CS-2 and CS-3 schemes so that they give rise to overall coding rates of about ⅔ and of about ¾, respectively.

Each coded RLC/MAC block is transmitted in corresponding timeslots of four TDMA (Time-Division Multiple Access) frames on a carrier frequency, the successive TDMA frames each being broken down into eight timeslots to provide for time-division channel multiplexing.

A pattern of eight signaling bits SB is inserted into each coded frame (two bits per timeslot) so as to indicate in particular which coding scheme has been applied by the transmitter.

These signaling bits are extracted from the coded block received by the addressee, to allow it to identify the coding scheme. The receiver then carries out the appropriate decoding of the block which will give rise to a positive acknowledgement if it is successful and if the decoded BCS is consistent with the content of the block.

The coding scheme applied to the downlink is determined in a way in which is known in itself by the PCU 22 on the basis of measurements of reception quality on the radio link, according to link adaptation mechanisms which seek to achieve an target in terms of rate of error-affected blocks so as to optimize the raw throughput. The selected scheme is inserted into the TRAU frame carrying the block so as to be applied by the BTS 20.

The above-mentioned ETSI standards also specify an extension of the GPRS system, using EDGE (Enhanced Data for GSM Evolution) modulation. This extension is called EGPRS (EDGE-GPRS). In a EGPRS system, the RLC/MAC layer uses SNS=11, and WS adjustable between 64 and 1024. The RLC and MAC headers are grouped together into a single RLC/MAC header which no longer has the "Payload Type" field and in which the S/P bit is replaced by a two-bit ES/P subfield making it possible to specify different acknowledgement formats when polling.

Nine modulation and coding schemes, called MCS-1 to MCS-9 are provided. The scheme used for a given block, as well as any puncturing scheme being applied, are indicated in a CPS (Coding and Puncturing Scheme indicator) field of the EGPRS RLC/MAC header.

The whole of the EGPRS RLC/MAC header is the subject of channel coding separate from that of the data of the block. The level of protection of this header against transmission errors is higher than that of the data, in order to ensure greater robustness of the signaling information. However, the present invention is not limited to highly protected header information.

Figure 8:
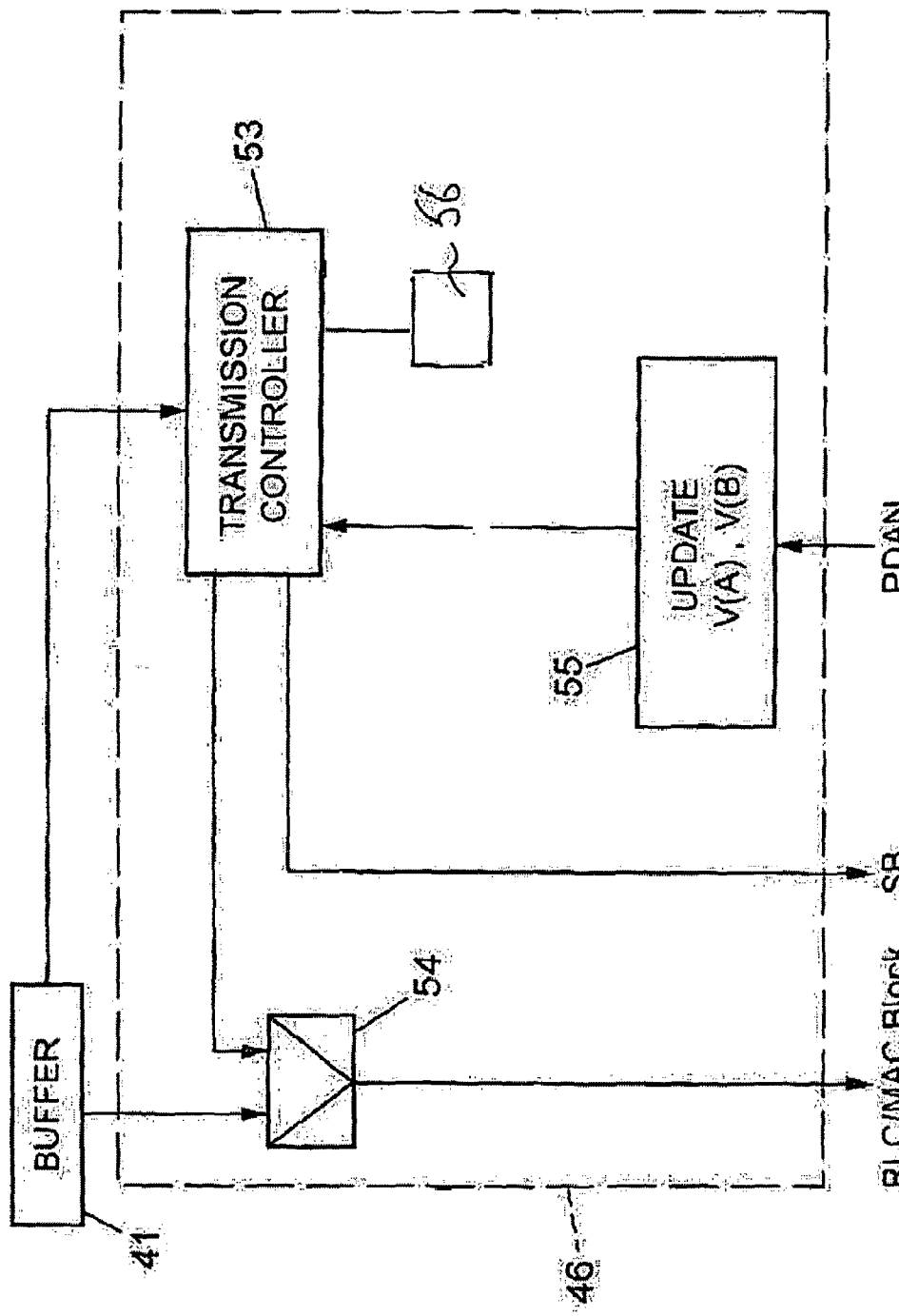
FIG. 8 is a PCU in accordance with an embodiment of the present invention.

FIG. 8 illustrates one possible organization of the RLC/MAC entity of the PCU 22 for a downlink TBF. The data of the LLC-PDU, which are segmented into RLC/MAC blocks, are kept in the buffer memory 41 until these blocks have been positively acknowledged. The transmission controller 53 has means to carry out each one of the following functions:

a) means to select a TBF for each transmission period on the channel, by means of a known scheduling mechanism;

b) for the selected TBF, means to select an RLC/MAC block to be transmitted, especially on the basis of the state variables V(A) and V(B) and of the presence or absence of a new block in the queue relating to the TBF in the transmission buffer 41;

c) means to select the coding schemes CS-i which the BTS 20 will apply to the block, and allocation of the corresponding value to the eight-bit signaling pattern SB. If the ARQ mechanism has led to selection of a block which has already been transmitted previously, the coding scheme adopted may be the same (GPRS case) or a more robust scheme (option in case of EGPRS). If the selected block is a new block, the coding scheme is determined by a conventional link adaptation mechanism, d) if the selected block is a new block, means to extract a number of bits of information from the buffer 41, this number corresponding to the size defined for the coding scheme adopted; if not, new extraction of the data from the previously transmitted block;

e) means to determine the content of the RLC/MAC header and control of the insertion of this header by a module 54. The transmission controller 53 sets the TFI and BSN fields as well as the S/P-RRBP acknowledgement control field to poll the MS for acknowledgement.

The RLC/MAC block delivered by the module and the SB bits form part of the information placed in a TRAU frame transmitted to the BTS involved.

The module 55 represented in FIG. 8 handles the PDAN messages received from the addressee UE to update the state variables V(A) and V(B) of the TBF. The blocks of the TBF which were transmitted by the PCU 22 after the polling block to which a PDAN message responds remain in the ACK_PENDING state, while the other blocks which have been transmitted up to this polling block are set to the ACK or NACK state depending on the value of the corresponding bit of the RBB bitmap (in EGPRS, this RBB bitmap can be transmitted in compressed form, and then has to be decoded correspondingly by the module).

The present invention relates to the operation of the transmission controller 53. In conventional systems the transmission controller 53 polls a UE during a TBF at fixed intervals. In accordance with embodiments of the present invention the transmission controller 53 can select a variable length polling interval for each UE 10. The selection may be for all UE's a group of UE's, especially a group of UE's which subscribe to a certain service/QoS profile, or on a UE-by-UE basis. In accordance with another aspect of the present invention the transmission controller 53 has means for polling interval selection that depends upon QoS requirements of the network. In particular, the selection of polling interval may depend upon factors which favor a shorter polling interval and/or factors which favor a longer polling interval.

Table 1 is derived from the book "Principes de Radiocommunication de Troisième Génération", T. Lucidarme, Vuibert, 2002, section 2.6.4 and provides various QoS parameters which can be dynamically adjusted in accordance with embodiments of the present invention.

TABLE 1

| Class of service | QoS parameters |
| --- | --- |
| Priority | 1, 2, 3 (1 is the highest) |
| Reliability | 1-5 (5 is the most reliable) |
| Transmission delay | 1-4 (1 is the most rapid) |
| Maximum Data Rate allowed | 1-9 (9 is the highest rate) |
| Average Data Rate expected | 1-18, (18 is the highest average rate) |

Examples of factors which can favor a shorter polling interval may be selected from at least one of:
1) Messages sent and received by a UE 10 communicated over a certain time period are short. This is an indication of an interactive application, e.g. can occur when a game is being played using SMS. In this case, the UE 10 may wait an excessively long time on average before receiving an answer if the polling interval is not reduced.
2) When the reception is poor and/or when the coding scheme used for the headers and/or the blocks is not well protected. In this case a large number of repeat requests can be expected so that a UE 10 will be in a position to request a resend of a block very often.
3) Time of day or geographical location of the relevant cell. Time of day (peak hours, evening, night) and geographical location (rural, city center) may also be suitable parameters to determine polling interval.
4) When the length of the TBF is selected to be short as part of an optimization scheme. The longer the TBF, the more bandwidth is available for other traffic. However, a short TBF may be appropriate when there is a long wait for answers, e.g. when browsing and the Internet access is slow.
5) When buffering at the PCU 22 is reaching capacity. When a large number of blocks are being buffered at a PCU 22 an attempt can be made to reduce this by polling at a higher rate. In this way, as soon as a UE 10 is ready to acknowledge blocks and thus free them from the buffer, a polling command is sent.

Examples of factors which can favor not shortening the polling interval may be selected from at least one of:
1. Messages sent and received by a UE 10 over a time period are long and the reception is good. This can occur when sending large files. In this case, it is inefficient to poll when nothing is to be resent.
2. The cell is congested. In case of high traffic, lengthening the polling interval reduces the number of control messages and therefore increases traffic capacity. This can also be used to discourage non-vital activities such as games at peak hours by deliberately slowing down responses.
3. Some UE's 10 have a high priority rating while some UE's 10 have a low priority and require short polling intervals. The priority rating is obtainable by the PCU 22 from an information element as indicated in table 1 above. In this case high polling rates may reduce the bandwidth for high priority users. In this case a better service can be provided for the high priority users by not shortening the polling interval.
4. Time of day or geographical location of the relevant cell. Time of day (peak hours, evening, night) and geographical location (rural, city center) may also be suitable parameters to determine polling interval.

In accordance with embodiments of the present invention the PCU 22 comprises means to determine whether a UE or a group of UE's or all or none of the UE's are polled by one of at least two polling intervals. In the following various methods of determining which UE's should have shorter or longer polling intervals will be described.

Across the Gb interface signals for many UE's are multiplexed. The SGSN communicates with the BSS using PDU's. A PDU may contain a reference to the UE by means of the TLLI and/or the IMSI. In addition it may contain priority information, QoS profile information, a cell identifier to identify with which radio cell a UE is communicating, a location area in which a UE is registered, the location area normally being larger than one cell, and/or a routing area which is similar to a location area but specifically related to data traffic, e.g. via GPRS services. Thus, being examining these PDU's a PCU 22 and in particular the transmission controller 53 can extract and store QoS relevant information, e.g. information linking UE identifiers (IMSI and/or TLLI), a geographical area in which a UE is located (cell, routing area or location area) as well as QoS information (QoS profile, priority, etc.). This information may be stored in a suitable memory, e.g. storage unit 56 with which the transmission controller is in communication. For instance, the storage unit 56 may store a table comprising the QoS relevant information described above. This table is a record of potential activity.

In accordance with embodiments of the present invention the transmission controller 53 accesses the storage unit 56 and calculates relevant statistics in order to decide on whether a shorter polling time is to be initiated. The relevant statistics may include the number of active UE's associated with a certain geographical area and a QoS profile. For example, the operational congestion of a geographical area may be estimated in the following way for each of N QoS profiles Q1 ... QN, a bandwidth $B^1 1 ... B^1 N$ is determined for the expected usage of the air interface for a UE which subscribes to the relevant QoS profile and for a first polling interval as well as a number of UE's N1 ... NN for each QoS profile. The relevant bandwidth B may be determined, for instance, as a guaranteed bandwidth for the relevant subscription or as a statistical average of actually used bandwidth. For one or more QoS profiles a second polling interval, e.g. a shorter polling interval may be selected by the transmission controller 53. This second interval will result in a different bandwidth for each QoS, that is bandwidths $B^2 1 ... B^2 N$. From the Assuming by way of example only that one QoS profile has a second bandwidth $B^2$ and that the total available bandwidth in a geographical area is $B_{TOTAL}$ then in accordance with an embodiment of the present invention the transmission controller calculates the relationship between the expected bandwidth and the total available bandwidth. For example, the decision to allow a shorter polling interval for the QoS profile QM may be determined provided:

$$\Sigma N1 \times B^1 1 + N2 \times B^1 2 ... + NM \times B^2 M + ... + NN \times B^1 N \leq k_1 \times B_{TOTAL} \qquad \text{Eq. 1}$$

where $k_1$ is a constant which may be 1 or any other number. By remaining within the equality represented by Eq. 1, there is some safeguard that bandwidth requirements will not be exceeded for the relevant geographical area. By varying the value of $k_1$, the security can be increased or decreased.

In accordance with a further embodiment the number of UE's of one QoS profile which can be allowed a shorter polling interval can be calculated in accordance with Eq. 2:

$$\frac{k_2 B_{TOTAL} - \left( \sum \frac{N1 \times B^1 1 + N2 \times B^1 2 ... + NM \times B^1 M + ... + NN \times B^1 N}{B^2 M - B^1 M} \right)}{} \qquad \text{Eq. 2}$$

Where $k_2$ is a number such as $k_1$.

Eq. 2 calculates the difference between $B_{TOTAL}$ (optionally multiplied by a factor $k_2$) and the estimated bandwidth for the current active UE's. This difference represents the available bandwidth which may be used up for shorter polling intervals. By dividing this bandwidth by the difference between the bandwidth for UE's with the Mth QoS profile when there is short and normal polling intervals; the number of UE's which may be changed from normal polling to shorter polling can be determined.

The skilled person will appreciate that Eq.s 1 and 2 can be modified to allow more than one set of UE's to have shorter polling intervals. The present invention also includes within its scope other algorithms for determining whether shorter polling should be allowed. For example, simply the percentage of UE's having a specific QoS profile may be used as a decision criterion. The make this decision the transmission controller 53 may include a decision circuit.

Figure 9:
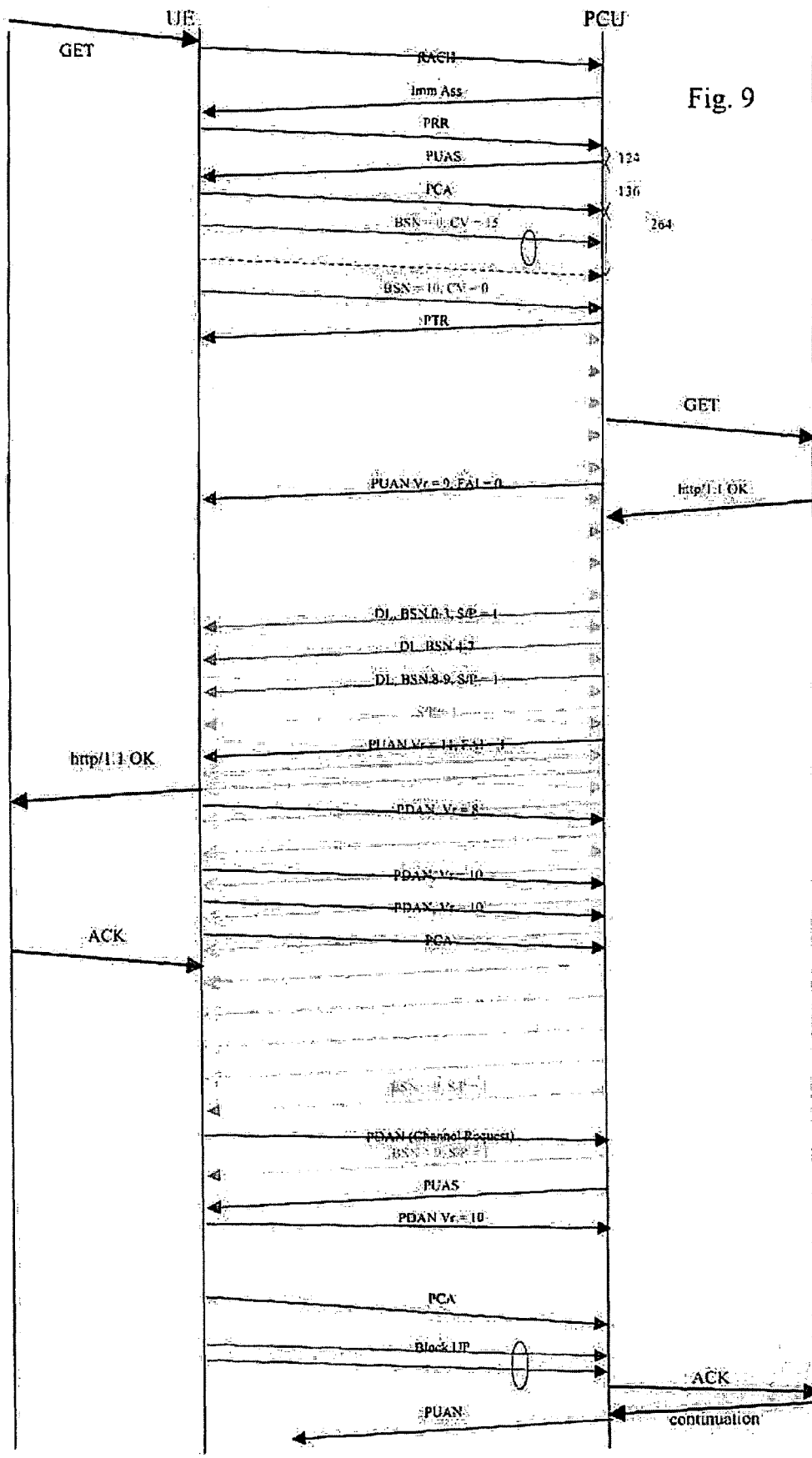
FIG. 9 is a message flow of data blocks across an air interface for illustrating the present invention.

A more detailed scheme for carrying out the above embodiment is shown in FIG. 9. The message flows are between the UE 10 and the PCU 22 and between the PCU 22 and the SGSN 5. FIG. 9 shows the case of a UE initiated request for data transfer. Initially the UE 10 receives a GET information command (e.g. from a laptop running a browser) and makes a request for data transfer on a control channel. This control channel may be a random access channel (RACH) and the request may be transmitted several times (in case of contention). This request is assigned by the PCU to a specific traffic channel, i.e. to a timeslot or slots, with an Immediate Assignment message. The UE 10 responds with a Packet Resource Request (PRR). The PCU 22 responds with a Packet Uplink Assignment message (PUAS) which contains the relevant TFI as well as the exact time when the transmission must take place. The UE 10 responds with a Packer Control Acknowledgement message (PCA). The UE 10 now transmits the data blocks required in a traffic channel using the timeslot specified at the appropriate time. In this case it is 11 blocks which BSN 0-10. To allow tracking of the end of the uplink data transmission, the UE 10 provides a reference identification, e.g. a "CV" (Countdown Value), which counts down the last few blocks of the transmission, e.g. the last 15 blocks.

At this point an optional message (PTR) to reconfigure for a downlink transmission may be sent. This provides the timeslot and TFI for the transmission and alerts the UE 10 to a coming downlink transmission which saves time in setting this up later. This avoids sending a packet downlink assignment to the relevant UE using a control channel. However, the latter method is also within the scope of the present invention. The PCU 22, sends a GET information command to the SGSN, i.e. forwards the message just received from the UE 10. After the uplink data has been received, the PCU 22 determines whether there were any bad frames and requests retransmission from the UE of any frames or blocks that are necessary. Then the uplink connection is released. In the present case 9 of the blocks are released with a PUAN message which is flagged with FAI=0, i.e. accepted. The UE can now delete these blocks from its buffer. However, the TBF is not terminated as BSN 9 and 10 have not been accepted. On receipt of the requested data (http OK) from the SGSN 5, the PCU 22 transmits the relevant blocks, In this case blocks with BSN 0-3 with ARQ, blocks with BSN 4-6 and blocks with BSN 8, 9 with ARQ. The UE 10 listens for the relevant TFI in the allocated timeslot for a period of time, e.g. 5 seconds. The UE 10 decodes every block in the timeslot allocated to it to see if it contains the specified TFI. If no reply comes within the predetermined time, the PCU 22 initiates release of the downlink connection and the UE 10 no longer listens on this timeslot. In this case the blocks with BSN 0-9 are transmitted. At this moment the PCU 22 determines that the 11 blocks transmitted on the uplink were all received correctly and the uplink TBF can be terminated. Accordingly it sends a PUAN message specifying 11 blocks (V(r)=11) with the flag FAI=1. The UE 10 responds with a PCA message somewhat later. The PCU 22 can then safely stop the TBF. If the PCA is not sent the TBF is timed out. This terminates the uplink TBF. Having received the 10 downlink blocks the UE 10 now transfers these blocks to the browser and awaits a response as to their correctness. In order to keep the downlink TBF alive the UE 10 can send one or more PDAN messages, e.g. to release a number of the received blocks (V(r)=8) or a PDAN which does not terminate the TBF. It is during this time that the PCU transmission controller 53 sends polling commands (here shown with BSN=9, S/P=1). The rate at which these commands are sent and the ability to vary this rate is an aspect of the present invention. In particular, any of the methods of the present invention as detailed above and as claimed in the attached claims may be used to determine the polling interval and/or when this should be changed.

In response to the polling commands the UE 10 requests a channel using a PDAN channel request. This is assigned and acknowledged in the conventional manner. Then the UE 10 transmits the ACK information to the PCU 22. From this point on the procedure repeats itself.

While the invention has been shown and described with reference to preferred embodiments, it will be understood by those skilled in the art that various changes or modifications in form and detail may be made without departing from the scope and spirit of this invention.

The invention claimed is:

1. An apparatus for transmitting data blocks on a communications channel having a radio link between two stations including a user equipment, comprising:
    means for receiving first data blocks from the user equipment;
    means for transmitting second data blocks to the user equipment;
    means for transmitting polling messages to the user equipment to request that the user equipment acknowledges receipt of the second data blocks; and
    means for dynamically setting a polling interval for the transmission of the polling messages to the user equipment after transmission of the second data blocks,
the polling interval being set in accordance with at least one of: a size of one or more data blocks received by the apparatus from the user equipment, a size of one or more blocks transmitted from the apparatus to the user equipment, and a service to which the user equipment is subscribed.

2. The apparatus according to claim 1, wherein the means for dynamically setting a polling interval is adapted to set the polling interval for each user equipment independently.

3. The apparatus according to claim 1, wherein the means for dynamically setting a polling interval is adapted to set the polling interval for a group of user equipments.

4. The apparatus according to claim 3, wherein the group of user equipments is defined by a subscription to a service.

5. The apparatus according to claim 1, wherein the user equipment comprises one or more user equipments having a first priority and one or more user equipments having a second priority lower than the first priority, and the means for dynamically setting a polling interval is adapted to reduce the polling interval when the user equipments having a first priority are not transmitting.

6. The apparatus according to claim 1, further comprising a buffer means for buffering data blocks to be transmitted to the user equipment by the apparatus.

7. The apparatus according to claim 6, wherein the means for dynamically setting a polling interval is adapted to set the polling interval in accordance with an occupancy state of the buffer means.

8. The apparatus according to claim 1, wherein the user equipment is located in a radio coverage area of a cellular mobile radio network and the means for dynamically setting a polling interval is adapted to set the polling interval in accordance with at least an estimated used transmission capacity value for the radio coverage area.

9. The apparatus according to claim 1, wherein the means for dynamically setting a polling interval includes a storage unit for storing information relating to user equipments.

10. The apparatus according to claim 9, wherein the storage unit includes data relating to any of: a user equipment identifier, a quality of service profile associated with a user equipment, a number of user equipments located within a geographical area.

11. The apparatus according to claim 1, wherein the means for dynamically setting a polling interval is adapted to set the polling interval in accordance with a quality parameter of signals received over the radio link.

12. A cellular radio telecommunication network comprising one or more base stations in communication with one or more user equipments, the network comprising an apparatus for transmitting data blocks on a communications channel having a radio link between two stations including a user equipment, the apparatus comprising:
    means for receiving first data blocks from the user equipment;
    means for transmitting second data blocks to the user equipment;
    means for transmitting polling messages to the user equipment to request that the user equipment acknowledges receipt of the second data blocks; and
    means for dynamically setting a polling interval for the transmission of the polling messages to the user equipment after transmission of the second data blocks,
the polling interval being set in accordance with at least one of: a size of one or more data blocks received by the apparatus from the user equipment, a size of one or more blocks transmitted from the apparatus to the user equipment, and a service to which the user equipment is subscribed.

13. The cellular radio telecommunications network according to claim 12, wherein the apparatus is a packet control unit which has a first input for data from an asynchronous interface and a second input for data from a synchronous interface.

14. A method for transmitting data blocks over a communications channel including a radio link between two stations to and from a user equipment, comprising:
    receiving first data blocks from the user equipment;
    transmitting second data blocks to the user equipment;
    transmitting polling messages to the user equipment to request that the user equipment acknowledges receipt of the second data blocks; and
    dynamically setting a polling interval for the transmission of the polling messages to the user equipment after transmission of the second data blocks,
the polling interval being set in accordance with at least one of: a size of one or more data blocks received by the apparatus from the user equipment, a size of one or more blocks transmitted from the apparatus to the user equipment, and a service to which the user equipment is subscribed.

15. The method according to claim 14, wherein dynamically setting a polling interval comprises setting the polling interval for each user equipment independently.

16. The method according to claim 14, wherein dynamically setting a polling interval comprises setting the polling interval for a group of user equipments.

17. The method according to claim 14, wherein the user equipment comprises one or more user equipments having a first priority and one or more user equipments having a second priority lower than the first priority, and dynamically setting a polling interval comprises reducing the polling interval when the user equipments having a first priority are not transmitting.

18. The method according to claim 14, wherein the user equipment is located in a radio coverage area of a cellular mobile radio network and dynamically setting a polling interval comprises setting the polling interval in accordance with at least an estimated used transmission capacity value for the radio coverage area.

* * * * *